United States Patent
Park

(10) Patent No.: US 8,913,759 B2
(45) Date of Patent: Dec. 16, 2014

(54) METHOD AND APPARATUS FOR CONTROLLING VOLUME IN AN ELECTRONIC MACHINE

(75) Inventor: Sung Hwan Park, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 543 days.

(21) Appl. No.: 12/845,915

(22) Filed: Jul. 29, 2010

(65) Prior Publication Data

US 2011/0026737 A1 Feb. 3, 2011

(30) Foreign Application Priority Data

Jul. 30, 2009 (KR) .................. 10-2009-0069985

(51) Int. Cl.
*H03G 3/00* (2006.01)
*H04R 5/04* (2006.01)
*G06F 3/16* (2006.01)

(52) U.S. Cl.
CPC . *H04R 5/04* (2013.01); *G06F 3/165* (2013.01)
USPC ............................ 381/104; 381/107; 381/109

(58) Field of Classification Search
USPC ......... 381/104, 105, 106, 107, 109, 110, 118, 381/120, 108, 59, 57, 119, 86, 332, 28; 379/390.01; 700/94; 455/251.1
See application file for complete search history.

(56) References Cited

U.S. PATENT DOCUMENTS 5,513,268 A * 4/1996 Bironas et al. ................. 381/109
2008/0089535 A1 * 4/2008 Hong ............................. 381/109

FOREIGN PATENT DOCUMENTS

JP 2005280580 A * 10/2005 .............. B60R 11/02

* cited by examiner

*Primary Examiner* — Leshui Zhang
(74) *Attorney, Agent, or Firm* — Cha & Reiter, LLC

(57) ABSTRACT

A method and an apparatus for controlling/adjusting volume, which can set multiple volume modes having different volume intervals and control volume by a volume interval of a corresponding volume mode according to a given circumstance in an electronic device having a volume change function. The method includes detecting a volume change event; when the volume change event is a volume mode change, changing a current volume mode to a volume mode corresponding to the volume change event; and when the volume change event is a volume value change, controlling volume up/down in response to the volume change event.

20 Claims, 7 Drawing Sheets

METHOD AND APPARATUS FOR CONTROLLING VOLUME IN AN ELECTRONIC MACHINE

CLAIM OF PRIORITY

This application claims the benefit of priority under 35 U.S.C. §119 from Korean Patent Application No. 10-2009-0069985 filed in the Korean Intellectual Property Office on Jul. 30, 2009, the entire contents of which are incorporated herein by reference in its entirety.

BACKGROUND OF THE INVENTION

1. Field of the Invention

The present invention relates to a method and an apparatus for controlling a volume level. More particularly, the present invention relates to a method and an apparatus for controlling volume, in which multiple volume modes having different volume control intervals are set in an electronic machine (i.e. device).

2. Description of the Related Art

Generally, electronic devices designed for the listening and recording of sound, can convert a sound wave (30 Hz to 16,000 Hz commonly) within an audio frequency band, such as music, a human voice, and a natural sound, to electric energy and then records the converted electric energy in a recording medium. Conversely, electronic devices can also convert a recorded electronic signal to a sound wave energy and output the converted sound wave energy to a space through a transducer, such as a loud speaker, headset, etc.

The conventional electronic device for sound reproduction is provided with a status in which an interval between the minimum volume level and the maximum volume level, e.g. from Vol. level 0 to Vol. level 10 (with level 10 typically being a maximum level), is set in predetermined intervals. According to the volume levels, a user of the electronic device can control (i.e. adjust) a volume of an audio signal output, which is being reproduced in the electronic device and output through the speaker, as a desired volume level in dependence on surrounding circumstances. For example, in a noisier environment, the user typically raises the volume level to overcome background noise. Also, the user may be sensitive to loud sounds, or conversely, suffer from hearing loss.

However, the audio volume in the electronic machine is controlled in incremental/decremental stages between the minimum level and the maximum level. Therefore, in order to select and designate a desired volume level, the user has to repeat the operation of turning up the volume in incremental stages from the lowest level or turning down the volume in decremental stages from the highest level. For example, the user can adjust a volume value according to the number of volume up/down operations by using an input means for adjusting the volume.

Therefore, in the volume system having a regular volume interval, the volume interval is regularly set so that there is a problem in that it is difficult to immediately adjust the volume according to the given circumstance of the user.

For example, in order to turn up the volume to the desired volume level in a place having a loud surrounding (background) noise, the user has to pass every volume interval in stages set from the lower volume level to the desired high volume level. If it is assumed that a current volume level is 1 (Vol. 1) and a volume level desired by the user is 23 (Vol. 23), the user can only reach the desired volume level through making 23 repeated operations.

In an attempt to solve the aforementioned problem of reducing repeated operations to adjust the volume, an electronic device was designed in which the volume difference between the volume levels is set to be greater than 1 level, but the variance between the volumes is great in such an electronic device. Therefore, it is possible to rapidly change the volume between the volume levels, but it is difficult to finely control the volume in such a device because of the large variance.

Conversely to the aforementioned attempt to overcome the problems in the art, when fine tuning of volume control is desirable in an electronic machine, the volume difference between the volume levels can be set to be smaller than 1 level, making the variance between the volumes relatively small, so that it is possible to finely control the volume, but this design does not rapidly change the volume between the volume levels and suffers from the problems mentioned herein above. If the volume control interval is set to be small in the conventional electronic device, it is possible to finely adjust the volume. However, permitting fine adjustment of the volume introduces or exacerbates the problem in that it takes much time in adjusting the volume from the minimum volume level to the maximum volume level or from the maximum volume level to the minimum volume level.

However, if the volume control interval is set to be wide, it is possible to immediately adjust the volume from the minimum volume level to the maximum volume level or from the maximum volume level to the minimum volume level. However, there is still the problem in that it is difficult to finely adjust the volume.

SUMMARY OF THE INVENTION

The present invention provides a method and apparatus for adjusting volume, which can optionally set the variance between volumes according to a given circumstance of a user, to provide the user with convenience in adjusting the volume. The present invention also provides a method and an apparatus for adjusting volume, which can set multiple volume modes having different volume intervals and adjust volume by a volume interval of a corresponding volume mode according to a given circumstance in an electronic machine having a volume change function.

Further, the present invention provides a method and apparatus for controlling/adjusting volume, which can set multiple volume modes having different volume intervals and adjust volume by a volume interval of a corresponding volume mode depending on each given circumstance in an electronic device having a volume change function.

In accordance with an exemplary aspect of the present invention, a method for adjusting volume in an electronic device preferably includes: detecting a volume change event; when the volume change event is a volume mode change, changing a current volume mode to a volume mode corresponding to the volume change event; and when the volume change event is a volume value change, adjusting the volume up/down in response to the volume change event.

In accordance with another exemplary aspect of the present invention, a method for adjusting volume in an electronic machine preferably includes: detecting a volume change event; when the volume change event has been detected, determining a type of the volume change event; when the volume change event is a volume mode change, identifying a volume mode corresponding to the volume change event from among multiple volume modes comprising different volume interval values; and changing a volume level based on a profile of the identified volume mode.

BRIEF DESCRIPTION OF THE DRAWINGS

The following exemplary aspects and advantages of the present invention will become more apparent from the following detailed description in conjunction with the accompanying drawings, in which.

DETAILED DESCRIPTION

Hereinafter, exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

According to an exemplary embodiment of the present invention, the present invention can optionally set variance between volumes according to a given circumstance. To this end, a user can set multiple volume modes having different (individualized) volume intervals, respectively. That is, the user can set a different volume interval for each volume mode to be set and store the volume mode. Set information of a volume level according to each volume mode can be stored, for example, in a profile form. Therefore, through the selection of the volume mode (profile) according to a given circumstance, the user can change entire volume intervals in an interval value corresponding to the volume mode and set the changed volume mode.

Hereinafter, description will be given on an exemplary operation of setting volume modes having different volume intervals and controlling volume of the electronic machine by a volume interval mapped to a corresponding volume mode in the electronic machine according to an exemplary embodiment of the present invention. However, those skilled in the art will appreciate that the operation by the electronic device of the exemplary embodiment of the present is not limited to the following description, and can be applied to various exemplary embodiments based on the following examples.

Figure 1:
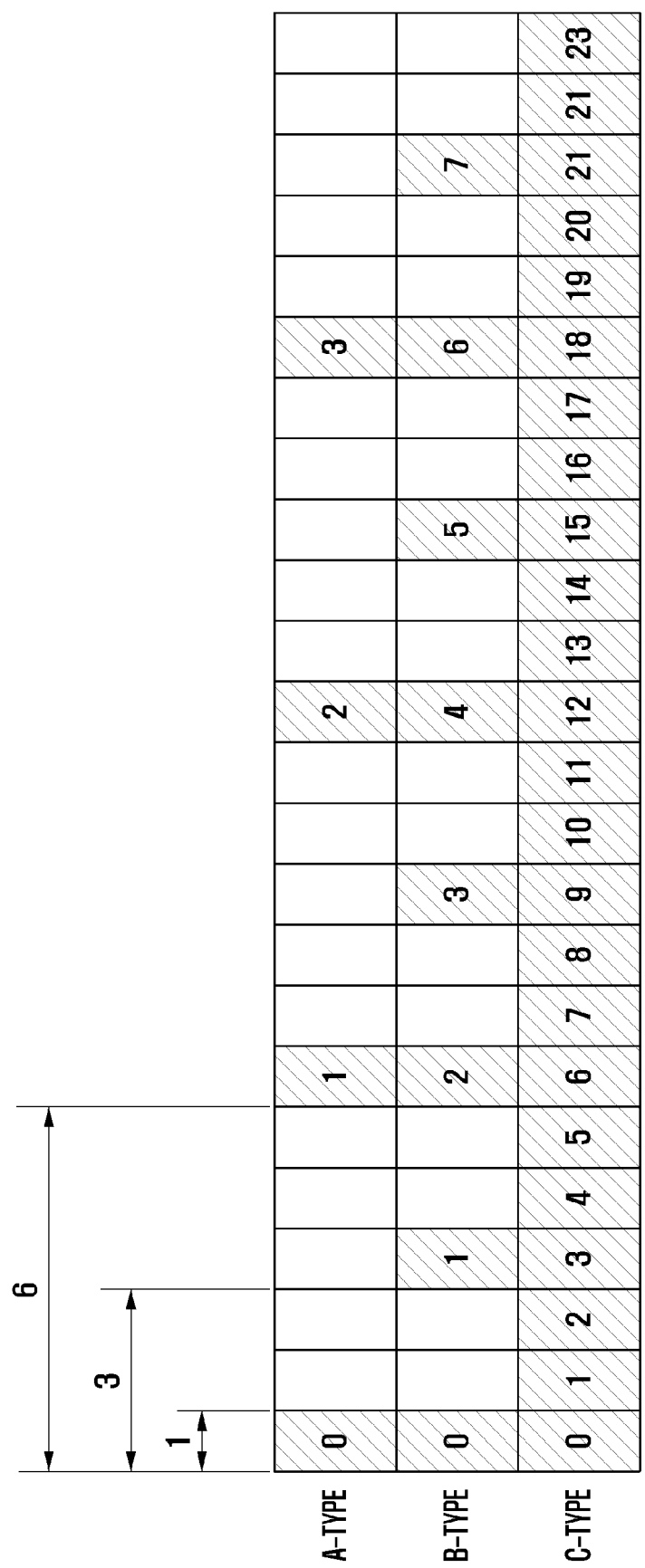
FIG. 1 is a diagram illustrating a volume system provided in an electronic device according to an exemplary embodiment of the present invention.

FIG. 1 is a diagram illustrating a volume system provided in an electronic device according to an exemplary embodiment of the present invention.

As illustrated in FIG. 1, the volume system according to this exemplary embodiment of the present invention can be divided into multiple volume levels having different volume intervals. For example, the volume system shown in FIG. 1 is divided into 3 volume levels including an A-type volume level in which <6> is assigned as a volume interval value, a B-type volume level in which <3> is assigned as a volume interval value, and a C-type volume level in which <1> is assigned as a volume interval value. At this time, only the volume system including 3 volume levels is not limited to the exemplary embodiment of the present invention, but various volume systems including at least 2 volume levels can be applied to the present invention. It is a matter of course that the volume system can be continuously added by a definition of the user.

Referring again to FIG. 1, the A-type volume level can be defined as a volume system for a noisy place, etc., which has a large variance between volumes. The B-type volume level is defined as a volume system to be used in a normal environment, which has an intermediate volume variance between the large variance and a fine variance. The C-type volume level is defined as a volume system, which enables a fine volume adjustment in a quiet place, etc.

For example, the volume interval value is set by <6> in the A-type volume level and the volume interval value is set by <1> in the C-type volume level. The A-type volume level and the C-type volume level will now be briefly compared. In the C-type volume level, six times of sequential operations in stages through, for example, volume levels <0>, <1>, <2>, <3>, <4>, <5>, to <6>, are required in order to turn up the volume level (i.e. the volume) up to 6 according to an up/down control by the user. In contrast, in the A-type volume level, one operation through volume levels <0> to <1> is required in order to turn up the volume level (i.e. the volume) up to 6.

Therefore, the user can select one volume level from among 3 types of volume levels according to a given circumstance. For example, if it is described on the assumption that the user rides a motorcycle, the user may feel the change of volume when he/she turns up the volume up to the 6 volume level in the existing volume system. In this case, according to the embodiment of the present invention, when the user selects the A-type volume level and turns up only 1 volume level, the user can feel the change of the volume. Further, if it is described on the assumption that the user listens to music in a quiet place and adjusts the volume in the existing volume system due to the dissatisfaction with current volume, the adjusted volume may sometimes not be the accurate volume desired by the user. In this case, when the user selects the C-type volume level according to the embodiment of the present invention, it is possible to finely adjust the volume according to the user's desire.

In the meantime, the volume levels according to each of the aforementioned types can be defined as a volume mode defined by the user. That is, the user can set multiple volume modes having different volume intervals as described above. Therefore, through simply selecting a volume mode, the user can rapidly adjust the volume through increasing the variance between volumes according to a given circumstance or finely adjust the volume through decreasing the variance between volumes.

With respect to the volume level based on each type, a volume interval of a corresponding volume level, and each of the types, setting information, such as a volume mode defined by the user, can be stored in a profile form in an electronic device, respectively. Therefore, when the user selects and designates a volume level of a specific type or when a volume mode, which is easily identified by the user, is set and the user selects and designates a corresponding volume mode, the electronic device can extract a profile correspondingly mapped to a corresponding volume level or volume mode and adjust the volume up/down according to a volume interval value of the corresponding profile.

Hereinafter, the construction of the electronic device according to the exemplary embodiment of the present invention will be schematically described. However, those skilled in the art will appreciate that the construction of the electronic device is not limited to the following description, and can be applied to various exemplary embodiments based on the following exemplary embodiment.

Figure 2:
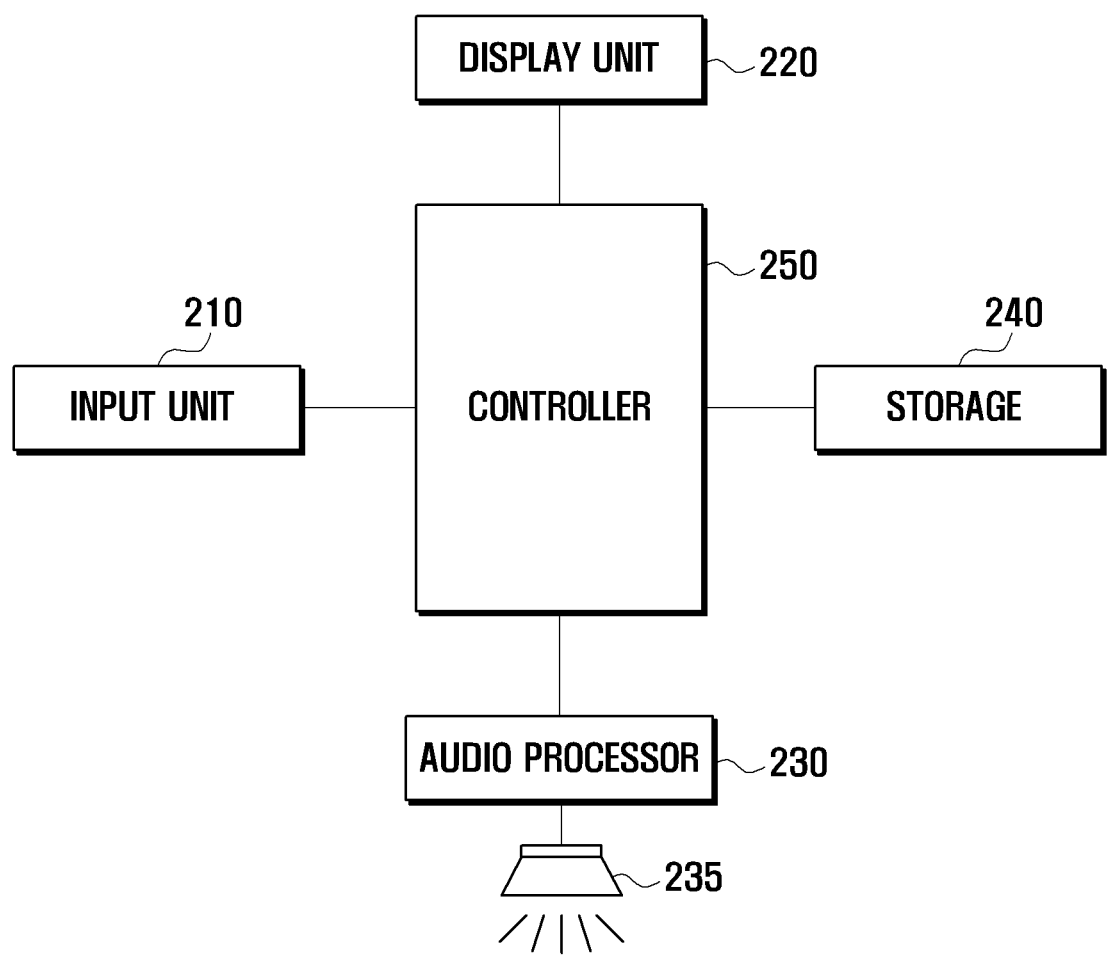
FIG. 2 is a diagram schematically illustrating the construction of an electronic device according to an exemplary embodiment of the present invention.

FIG. 2 is a diagram schematically illustrating the construction of the electronic device according to the exemplary embodiment of the present invention.

Referring now to FIG. 2, the electronic device according to the exemplary embodiment of the present invention includes an input unit 210, a display unit 220, an audio processor 230, a storage 240, and a controller 250.

The input unit 210 receives an input of various types of information and transfers a signal inputted in relation to the setting of various functions and the adjustment of the function of the electronic device to the controller 250. The input unit 210 generates an input signal according to an action of the user. Further, to this end, the input unit 210 can include at least one of a keypad, a function key, a dome key, a touch pad, etc. or the combination thereof. The input unit 210 can be included in a touch screen, which has an input/output function, according to a shape of the electronic device. The touch screen refers to an input/output device for simultaneously performing an input function and a display function. The user can select a volume mode and turns up/down the volume by using the function key or the touch screen of the input unit 210.

The display unit 220 can also be implemented by a Liquid Crystal Display (LCD) or an Organic Light Emitting Diodes (OLED), or in a form of a touch screen. Any other type of thin-film screen technology can also be used with the application. The display unit 220 displays various screen data generated during the performance of the function of the electronic device and status information according to the operation, the function setting, etc. by the user. In other words, the display unit 220 displays various screen data related to a status and an operation of the electronic device. The display unit 220 visually displays various signals and color information output from the controller 250. Especially, the display unit 220 displays mode change information according to the volume mode change.

The audio processor 230 is coupled with a speaker 235 and outputs an audio signal input from the controller 250 through the speaker 235. The audio processor 230 converts a digital voice signal inputted from the controller 250 into an analog voice signal. The audio processor 230 can reproduce various audio components, e.g. an audio signal according to the reproduction of a moving picture/music file, generated in the electronic device according to the selection of the user. Further, the audio processor 230 can output an audio component that is increased/decreased according to the control of the user.

The storage 240 includes Read Only Memory (ROM), Random Access Memory (RAM), etc. The storage 240 can store various data, etc. generated and utilized in the electronic device. The data includes data generated according to the execution of an application of the electronic device, every type of storable data generated by using the electronic device or received from an outside, etc. Especially, the data can include a user interface provided by the electronic device, various setting information according the use of the electronic device, audio contents, video contents, a plurality of profiles in which a volume control value is set according to each of the multiple volume modes, etc.

Further, the storage 240 can store an application for controlling a general operation of the electronic device, an application of the present invention, i.e. an application for controlling a volume value according to each volume mode, etc. The application of the present invention may be an application corresponding to the operation of the present invention described in FIG. 1 and other drawings to be described later. Such an application can be stored in an application storing area (not shown) of the storage 240. Further, the storage 240 can include at least one buffer, which temporarily stores data generated during the execution of the aforementioned application and the performance of the function of the electronic device.

With continued reference to FIG. 1, the controller 250, which may comprise a microprocessor, performs the general control function of the electronic device and controls a signal flow between the elements within the electronic device. That is, the controller 250 controls the signal flow between the elements, such as the input unit 210, the display unit 220, the audio processor 230, and the storage 240. Especially the controller 250 identifies a volume interval value of each of the profiles, which is assigned for each volume mode in the embodiment of the present invention, and controls the volume up/down according to the volume interval value. That is, the controller 250 identifies variance between volume intervals according to the selection of the user or a given event and correspondingly controls the volume.

The controller 250 controlling the above operations can also control the general operation of the present invention described with reference to FIG. 1 through the drawings to be described later. The aforementioned function control of the control unit 250 can be implemented by a special purpose microprocessor loaded with software and/or firmware, in order to implement the presently claimed invention.

FIG. 2 has schematically illustrated the construction of the electronic device for the convenience of description. However, the electronic device of the present invention is not limited to only the above illustrated construction. For example, the electronic device can include a wireless frequency unit for a mobile communication service, and in a particular case, the controller 250 can include a baseband module for the mobile communication service of the electronic device.

It has not been shown in FIG. 2, but it is a matter of course that the electronic device of the present invention can include an element, which has not been described in the above description, such as a touch pad or a touch screen, a camera module for photographing an object and obtaining image data corresponding to the photographing, a local area communication module for the local area communication, an internet communication module for communicating with an internet network to perform an internet function, and a GPS (Global Positioning System) for collecting location information, according to the shape of the electronic device, just to name a few possibilities.

The elements of the electronic device of the presently claimed invention can be variously modified according to the convergence trend of the digital devices, so that it is impossible to specify all of the equivalent thereof. However, an element in an equal level to the aforementioned elements can be further included in the electronic device. Further, it is a matter of course that a specific element can be excluded from the construction or replaced with another element in the electronic device of the present invention according to the form of the electronic device. These variations will be appreciated by those skilled in the art.

Figure 3:
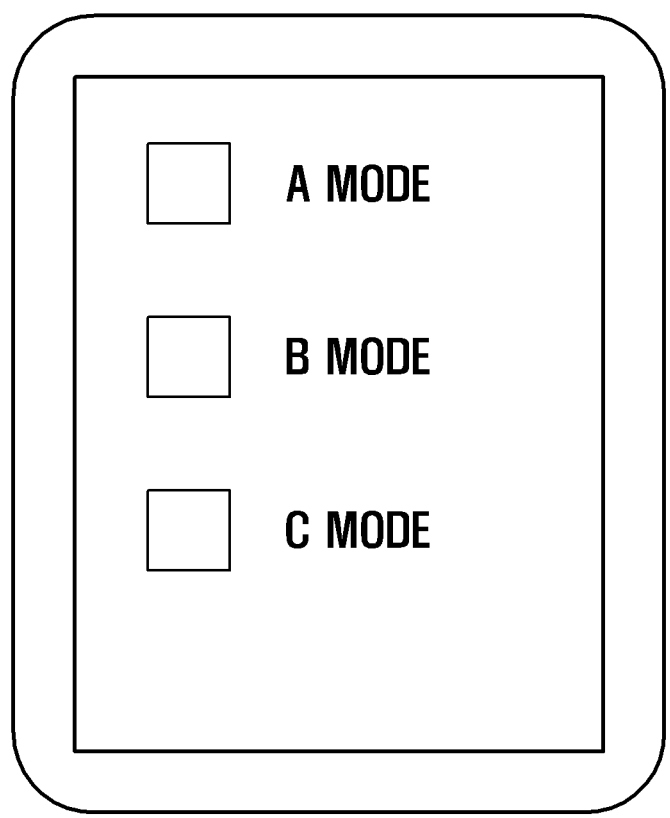
FIGS. 3 and 4 are diagrams illustrating screens for setting a volume mode having different volume intervals in an electronic device according to an exemplary embodiment of the present invention.
Figure 4:
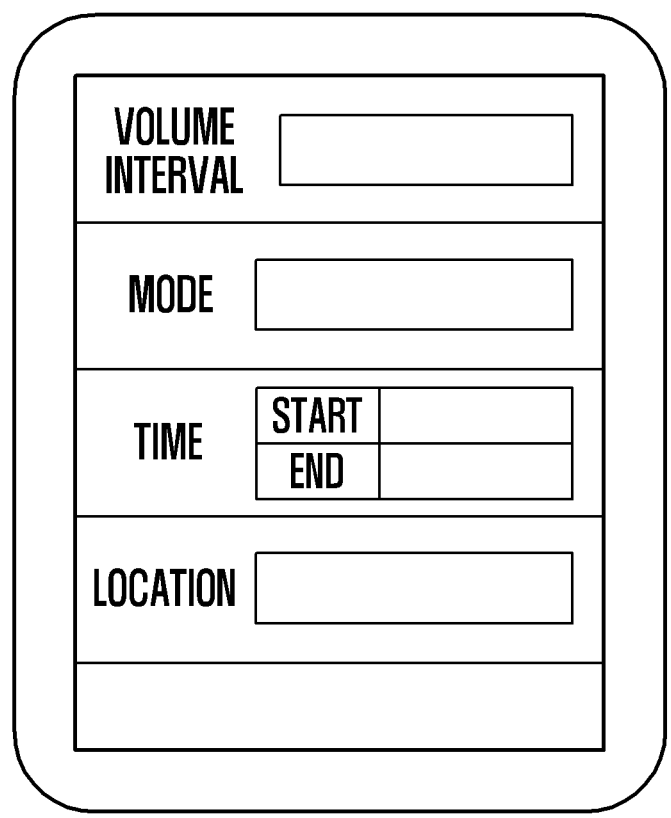

FIGS. 3 and 4 are diagrams illustrating screens for setting volume modes having different volume intervals in the electronic device according to the exemplary embodiment of the present invention. Referring now to FIGS. 3 and 4, according to the embodiment of the present invention, the present invention can set multiple volume modes having different volume interval values. As illustrated in FIG. 3, it is possible to map the multiple volume modes to each of the modes according to the desire of the user and provide the volume modes. "A mode", "B mode", and "C mode" can be predefined in the storage 240 according to a volume level for each type that has been set during the manufacturing of an electronic device or defined according to the setting by the user.

Further, it is a matter of course that a name of each mode can be optionally changed by the user and a new mode can be set and added. When a volume mode is added, the user can input various setting information as shown in FIG. 4. It is a matter of course that the setting information can be inputted by an operation of the input unit 210 or by a touch input through a touch screen (not shown).

As shown in FIGS. 1 to 4, according to a user's request for the volume-related setting by the user, the electronic device can provide a <volume interval> field, a <mode> field, a <time> field, a <location> field, etc. through the display unit 220. The user can set (edit, add, etc.) a volume mode by inputting at least one field among the above fields according to the user's selection. Then, information set by the user can either update existing information or be newly stored in the storage 240.

First, the user can set a desired volume interval value through the <volume interval> field. For example, when the user inputs 6 as the volume interval value, the A-type volume level of FIG. 1 can be provided. Further, when the user inputs 3 as the volume interval value, the B-type volume level of FIG. 1 can be provided. Further, when the user inputs 1 as the volume interval value, the C-type volume level of FIG. 1 can be provided. That is, the interval of the volume level is set according to the volume interval value.

Furthermore, in order to easily identify the volume level set as described above, the user can input information for identifying the corresponding volume level through the <mode> field. That is, the user can input information, for example, a name and a nickname of the volume mode. In addition, the user can input a "bike mode" and in this case, the <bike mode> is added to a list shown in FIG. 3 and displayed.

The user can also set time information, by which a volume level is automatically changed at a specific time, through the <time> field. At this time, the time information can include start time information and end time information. Therefore, the electronic device can check a volume mode change event based on the time information, change the existing volume level to the set volume mode with reference to the start time information of the time information, and change again from the changed volume mode to a basic "C mode" or a previous mode with reference to the end time information of the time information.

Further still, the user can set location information, by which a volume level is automatically changed in a specific location, through the <location> field. Therefore, the electronic device can check a volume mode change event based on the location information. When the electronic device enters a location corresponding to the location information, the electronic device can automatically change the existing volume level to the set volume mode, and when the electronic device leaves from the location corresponding to the location information, the electronic device can change again the changed volume mode to a basic "C mode" or a previous mode.

In the meantime, the volume interval value set, which is as shown in FIG. 4, and the corresponding volume level can be stored in the storage 240 of the electronic device in a form of a specific profile of a corresponding mode. Therefore, when the volume up/down is requested, the electronic device controls the volume up/down based on a corresponding profile of the current mode.

In the above exemplary description, the setting of the multiple volume levels having the different volume intervals and the operation of the multiple volume levels in the electronic device according to the exemplary embodiment of the present invention have been described herein. Hereinafter, in a circumstance in which multiple volume levels (profiles) having different volume intervals exist, an operation of changing a volume level through selecting a specific profile according to a given circumstance will now be described. However, those skilled in the art will appreciate that the electronic device of the presently claimed invention is not limited to the following description and thus can be applied to various exemplary embodiments based on the following example.

Figure 5:
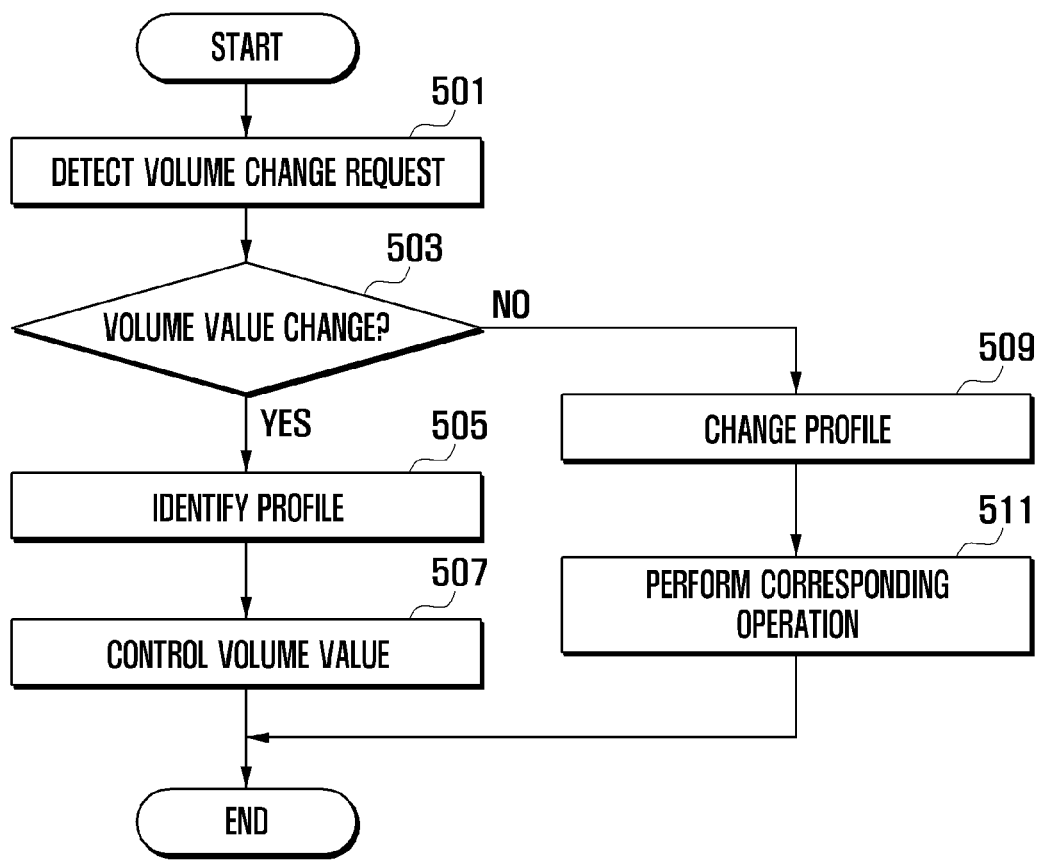
FIG. 5 is a flowchart illustrating a method for controlling volume in an electronic device according to an exemplary embodiment of the present invention.

FIG. 5 is a flowchart illustrating a method for controlling volume in the electronic device according to the exemplary embodiment of the present invention.

Referring now to FIG. 5, first at step (501), the controller 250 of the electronic device detects a volume change request made by the user. Here, the volume change request can be generated through the operation of the input unit 210 of the electronic device. Moreover, the user can request the volume change through the operation of a function key included in the input unit 210, or when the input unit 210 is included in the touch screen, the user can request the volume change through the touch input on the touch screen.

Then at step (503), the controller 250 determines if the volume change request is a volume mode change request or a volume value change request. Here, the volume mode change corresponds to the change of a profile for each mode, which has been predefined for each mode in the storage 240 of the electronic device as described above, and the volume value change corresponds to the increase or the decrease of a volume value according to setting information (the volume interval value) of a profile corresponding to a specific "C mode" that has been predefined in the storage 240 of the electronic device.

For example, the user can perform the volume mode change or the volume value change through the operation of the function key. At this time, the user can perform the volume value change through the up/down operation of the function key or perform the volume mode change through a long pressing during the up/down input operation of the function key according to a pre-set input method of the presently claimed invention.

Furthermore, the user can perform the volume mode change, or the user may change the volume value through the operation of the touch screen. At this time, the user can perform the volume value change through touching an area, which is allocated for the control of a volume function in the touch screen, and then making a dragging in the area in a set input method. Further, the user can perform the volume mode change through a flicking input in a corresponding area of the touch screen or touching another separately allocated area and then making a dragging in the another area in a set input method.

As a result of the determination in step 503, when it is determined that the volume change request requires the volume value change (that is, when step 503 results in "Yes"), then at step (505) the controller 250 identifies a profile corresponding to the currently set mode.

Then at step (507), the controller 250 controls a volume value in response to the user's request based on a volume interval value set in the profile. That is, the controller 250 can sequentially control/adjust the volume up/down corresponding to the number of input times and an input direction by the user, in a volume interval according to the volume interval value.

As a result of the determination in step 503, when it is determined that the volume change request requires the volume mode change (that is, when step 503 result in "No"), then at step (509) the controller 250 changes and sets the volume mode, based on a profile designated by the user among profiles predefined for each mode.

Here, the user can designate the desired profile through a menu selection or a predetermined input method (the function key input, the touch input, etc.). For example, the user can select the profile according to the number of input times and/or the input direction of the function key. Therefore, the controller 250 optionally identifies the profile designated through the user's input corresponding to the set input method and then controls/adjusts the increase/decrease of the volume value based on the volume interval value set in the profile.

Next, after the performing of the volume mode change, at step (511) the controller 250 performs an operation corresponding to a user's request. For example, the controller 250 repeats the process of changing the profile in response to a volume mode designating operation of the user or changes the volume value according to the volume value change request in the changed volume mode.

Figure 6:
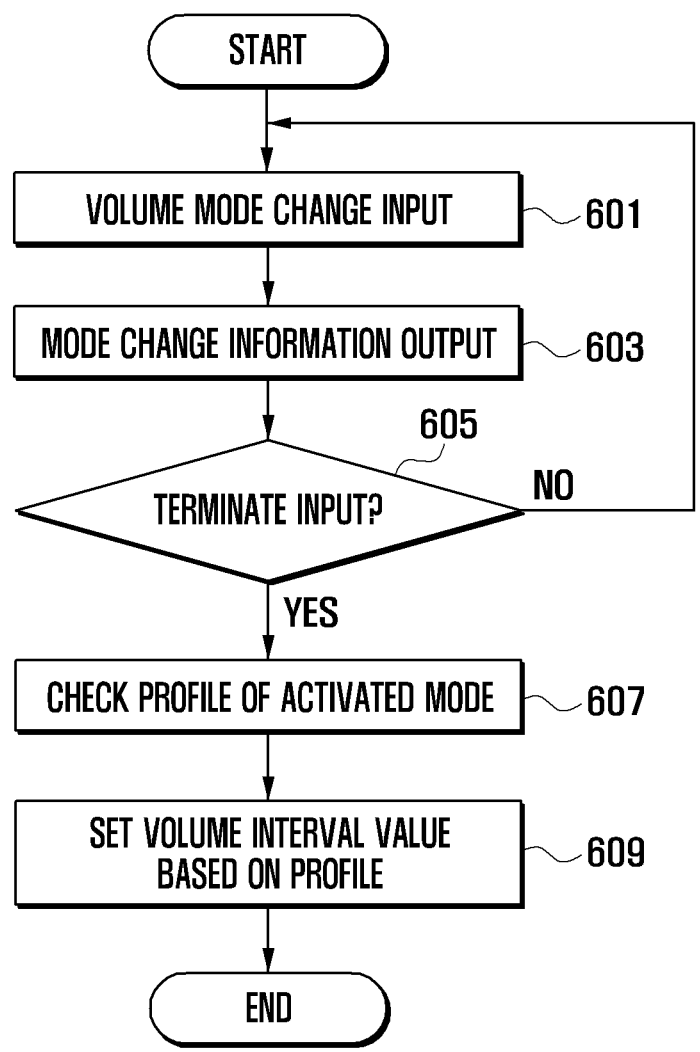
FIG. 6 is a flowchart illustrating an exemplary operation of changing a volume mode in an electronic device according to an exemplary embodiment of the present invention.

FIG. 6 is a flowchart illustrating an operation of changing the volume mode in the electronic device according to the exemplary embodiment of the present invention. In particular, FIG. 6 illustrates an example of the operation of changing the volume mode through a predefined specific input (touch input, function key input, etc.), not through the menu selection.

Referring now to FIG. 6, first at step (601), the controller 250 of the electronic device detects the volume mode change input. Here, the volume mode change input can be performed in a predefined method according to a form of the electronic device. For example, if it is possible to make an input through the touch screen (not shown) of the electronic device, the user can request the volume mode change through the touch screen according to a predefined touch input method. Further, the user can request the volume mode change through the operation of the function key included in the electronic device. Although omitted in FIG. 2, the electronic device can have the input unit 210 including the function key.

Next, when the controller 250 detects the volume mode change input, at step (603) the controller 250 generates mode change information changed according to the volume mode change input and outputs the generated mode change information through the display unit 220. The mode change information refers to information corresponding to at least two volume modes, which have been predefined in the storage 240 of the electronic device.

For example, as shown in FIG. 3, it is assumed that the "A mode", the "B mode", and the "C mode" have been predefined in the storage 240 of the electronic device, and a current mode is set as the "B mode". In this case, in response to the volume mode change input, the controller 250 can provide information of the mode, which is requested in a sequence of "C mode→A mode→B mode" or "A mode→C mode→B mode".

The mode change information can be provided in a pop-up form on the display unit 220. Here, it is a matter of course that the output of the mode change information in step 03 can be omitted depending on the form or the setting scheme of the electronic device.

Next, at step (605), the controller 250 checks whether or not the volume mode change input is terminated. The termination of the volume mode change input can be defined by a time point, at which after the volume mode change input by using the function key or the touch screen of the input unit 210 starts, a next input for the volume mode change has not been generated during a predetermined time.

Further, it is a matter of course that the termination of the volume mode change input can be defined by an additional input scheme for terminating the volume mode change input.

Next, when the volume mode change input is terminated at step (605), then at step (607) the controller 250 checks a profile of an activated volume mode at the time of the termination of the volume mode change input (or a final input time of the volume mode change input). For example, referring to FIG. 3, when the volume mode change input is terminated at the time in which the current "B mode" has been changed to the "C mode" and then the "A mode" according to the volume mode change input, the controller 250 can identify the "A mode" as the currently activated mode. Further, the controller 250 can verify the profile predefined in the "A mode". The mapping relation between the profile and each mode can be predefined corresponding to the input of the user and stored in the storage 240 as shown in FIG. 4.

Next, at step (609), the controller 250 sets a volume interval value according to the profile of the activated volume mode. Then, the controller 250 controls the increase/decrease of the volume value according to the changed and set volume interval value.

Figure 7:
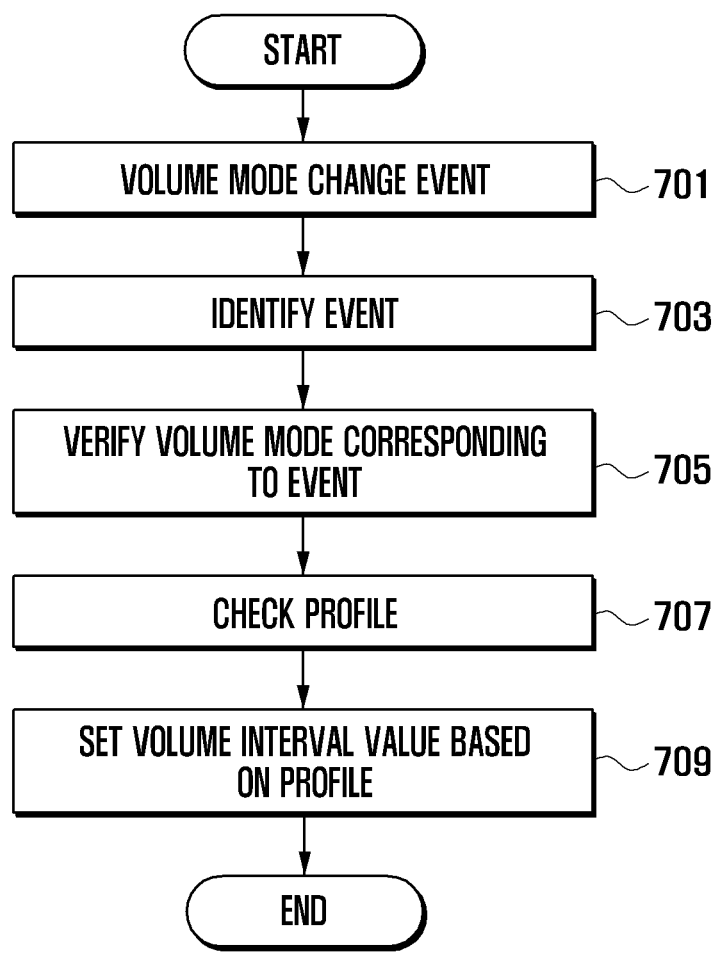
FIG. 7 is a flowchart illustrating an operation of changing a volume mode in an electronic device according to another exemplary embodiment of the present invention.

FIG. 7 is a flowchart illustrating exemplary operation of changing the volume mode in the electronic device according to yet another exemplary embodiment of the present invention. In particular, FIG. 7 illustrates an example of the operation of changing the volume mode through extracting an event according to setting information set for each volume mode.

Referring now to FIG. 7, first at step (701), the controller 250 of the electronic device detects a volume mode change event. Here, as described in the above with reference to FIG. 4, the volume mode change event may include an event, which automatically changes a volume mode according to event information, such as location information and time information, among the setting information for each volume mode. In this particular case, although not shown in FIG. 2, the electronic device can preferably include a collecting location information unit and/or a collecting time information unit.

For example, the controller 250 periodically tracks a location of the electronic device and checks if the location of the electronic device corresponds to pre-set location information. At this time, when the location of the electronic device corresponds to the pre-set location information stored in the storage 240 of the electronic device, the controller 250 generates the volume mode change event. Here, the tracking of the location of the electronic device can be implemented by a means separately included for the collection of the location information. The collection of the location information unit may include a collecting location information through transmitting/receiving a signal with a base station, or for obtaining location information from a satellite, etc.

Further, the controller 250 periodically tracks a time of the electronic device and checks if the time of the electronic device corresponds to pre-set time information. At this time, when the time of the electronic device corresponds to the pre-set time information stored in the storage 240 of the electronic device, the controller 250 generates the volume mode change event. Here, the tracking of the time of the electronic device can be implemented through an application of a timer (not shown) included in the electronic device.

Referring again to FIG. 7, at step (703), when the controller detects the volume mode change event, the controller 250 identifies by which condition the volume mode change event has been generated. That is, as described above, the controller 250 can identify if the volume mode change event has been generated by the time information or by the location information.

Next, at step (705) the controller 250 verifies a volume mode corresponding to the identified volume mode change event. For example, when the controller 250 identifies that the volume mode change event has been generated by the time information, the controller 250 can track a corresponding volume mode, in which the time information is set, in the storage 240. Otherwise, when the controller 250 identifies that the volume mode change event has been generated by the location information, the controller 250 can track a corresponding volume mode, in which the location information is set, in the storage 240.

At step (707), the controller 250 checks a profile of the verified volume mode. Then at step (709) the controller 250 sets a volume interval value according to the profile of the checked volume mode. The controller 250 then controls the increase/decrease of the volume value according to the changed and set volume interval value.

As illustrated in FIG. 7, according to this exemplary embodiment of the present invention, the user can designate the volume mode at the desired time and/or in the desired place. Further, when the electronic device enters the designated corresponding time or place, the volume mode is automatically changed to the corresponding volume mode, so that it is possible to turn up/down the volume depending on the specific time or place, thereby improving the convenience of the user.

The electronic device used in the exemplary embodiment of the present invention, which has been described with reference to FIGS. 1 to 7, refers to a device capable of outputting the audio component, and can include various types of devices including a compact device carried by the user and a medium/large device fixed to a specific place.

For example, the electronic device of the present invention includes every mobile communication terminal operated based on communication protocols corresponding to various communication systems, every information and communication device, such as a PMP (Portable Multimedia Player), a digital broadcasting player, a PDA (Personal Digital Assistant), a music reproducer (e.g. an MP3 player), a portable game terminal, a television, a notebook, various audio devices, a smart phone, a multimedia device, and its application, Further, the electronic device of the present invention includes a guide system providing various guide information requested by the user in a museum, an exhibition hall, an amusement park, a street, etc. The guide system includes a screen monitor, a media pole, etc. fixedly mounted on a wall, a pole, the ground, etc.

As described above, the method and apparatus for controlling the volume in the electronic device can set the multiple volume modes having the different volume intervals. Therefore, the user can select the corresponding volume mode according to a given circumstance, thereby improving the convenience in the volume control. That is, according to the present invention, it is possible to set the volume mode having the different volume intervals and control the volume by the volume interval of the corresponding volume mode according to a given circumstance.

Therefore, due to the present in invention, it is now possible to finely control the volume between the volumes through selecting the volume mode in which the volume interval is set to be narrow, in a circumstance in which the fine volume control is necessary. Further, it is now also possible at the same time to immediately control the volume through selecting the volume mode in which the volume interval is set to be wide, in a circumstance in which the large volume variance is required.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

In the meantime, the exemplary embodiments of the present invention have been provided only to easily explain and help general understanding of the present invention, not to limit the scope of the present invention. In addition to the disclosed embodiments, those skilled in the art will appreciate that many variances and modifications based on the technical sprits herein described are possible.

What is claimed is:

1. A method for adjusting sound volume in an electronic device, the method comprising:
    storing a plurality of profiles in which a volume control value is set according to each of a respective plurality of volume modes;
    selecting one among the plurality of profiles, each profile having a different volume control value throughout the same entire range from a low volume value to a high volume value of the electronic device, the selecting being performed responsive to one of: i) detecting that a current time is a specific time; and ii) detecting that a current location of the electronic device is at a predetermined location;
    setting the volume control value of the specific volume mode corresponding to the selected profile; and
    changing volume in accordance with a detected volume change input at a volume interval value corresponding to the specific volume mode.

2. The method of claim 1, wherein the plurality of volume modes comprises first, second and third volume modes.

3. The method of claim 1, wherein the selecting of the one profile occurs automatically upon detecting that the current time is the specific time.

4. The method of claim 3, further comprising providing a user selection option to pre-select the specific time.

5. The method of claim 1, wherein the selecting of the one profile occurs automatically upon detecting that the electronic device is at the predetermined location.

6. The method of claim 5, further comprising providing a user selection option to select the predetermined location.

7. The method of claim 1, further comprising:
providing a user selection option to select the specific time, which is a time that a current volume mode will change to a first predefined volume mode associated with the specific time; and
providing a user selection option to select at least one predefined location, including the predetermined location, at which a current volume mode will change to a second predefined volume mode associated with the at least one predefined location.

8. An electronic device comprising:
an audio processor to output sound through a speaker;
an input unit to receive user inputs;
a storage;
a display unit; and
a controller configured to: i) store a plurality of profiles in which a sound volume control value is set according to each of a respective plurality of volume modes to the storage; ii) select one among the plurality of profiles, each profile having a different volume control value throughout the same entire range from a low volume value to a high volume value of the electronic device; iii) set the volume control value of the specific volume mode corresponding to the selected profile via the input unit; and iv) control a change in volume through the audio processor and speaker in accordance with a detected volume change input at a volume interval value corresponding to the specific volume mode;
wherein the one profile is selected by the controller responsive to one of: 1) detecting that a current time is a specific time; and 2) detecting that a current location of the electronic device is at a predetermined location.

9. The device of claim 8, wherein the plurality of volume modes comprises first, second and third volume change interval modes.

10. The device of claim 8, wherein the one profile is selected by the controller automatically upon detecting that the current time is a specific time.

11. The device of claim 10, wherein the controller further provides a user selection option via the display unit to pre-select the specific time.

12. The device of claim 8, wherein the one profile is selected by the controller automatically upon detecting the electronic device being at the predetermined location.

13. The device of claim 12, wherein the controller provides a user selection option via the display unit to pre-select the predetermined location.

14. The device of claim 8, wherein the controller is further configured to:
provide via the display unit, a user selection option to select the specific time, which is a time that a current volume mode will change to a first predefined volume mode associated with the specific time; and
provide via the display unit, a user selection option to select at least one predefined location, including the predetermined location, at which a current volume mode will change to a second predefined volume mode associated with the at least one predefined location.

15. The method of claim 1, wherein each profile is stored in a predefined storage.

16. The method of claim 1, wherein at least first, second and third volume modes are provided, the first volume mode is a C-type mode which has a first volume control value for changing volume in first uniform increment units, the second volume mode is a B-type mode which has a second volume control value for changing volume in second uniform increment units which are three times the first uniform increment units, and the third volume mode is an A-type mode which has a third volume control value for changing volume in third uniform volume increment units which are twice the second uniform increment units.

17. The method of claim 1, wherein selecting one among the plurality of profiles comprises selecting the one profile according to a given circumstance of a user.

18. The method of claim 1 wherein selecting one among the plurality of profiles comprises selecting the one profile according to the detection of the manual input to the touch screen.

19. The method of claim 1, further comprising updating a profile and storing the updated profile into a storage according to a user setting.

20. The method of claim 1, wherein a first volume control value enables changes in volume in first uniform increment units and a second volume control value enables changes in volume in twice the first uniform increment units.

* * * * *